US012799977B2

(12) United States Patent
Wu et al.

(10) Patent No.: US 12,799,977 B2
(45) Date of Patent: Nov. 17, 2026

(54) SEALING SYSTEM

(71) Applicant: Guangzhou SINOMACH Sealing Technology Co., Ltd., Guangzhou (CN)

(72) Inventors: Jun Wu, Guangzhou (CN); Huoshou Liang, Guangzhou (CN); Kaixian Zhao, Guangzhou (CN); Ganglin Yan, Guangzhou (CN); Qibiao Wu, Guangzhou (CN); Xinwen Tan, Guangzhou (CN); Ruifeng Du, Guangzhou (CN); Zongze Che, Guangzhou (CN); Yishen Zheng, Guangzhou (CN)

(73) Assignee: Guangzhou SINOMACH Sealing Technology Co., Ltd., Guangzhou (CN)

( * ) Notice: Subject to any disclaimer, the term of this patent is extended or adjusted under 35 U.S.C. 154(b) by 6 days.

(21) Appl. No.: 19/023,928

(22) Filed: Jan. 16, 2025

(65) Prior Publication Data

US 2025/0237265 A1 Jul. 24, 2025

(30) Foreign Application Priority Data

Jan. 22, 2024 (CN) ......................... 202410091695.2

(51) Int. Cl.

*F16C 33/78* (2006.01)
*F16J 15/00* (2006.01)
*F16J 15/3268* (2016.01)

(52) U.S. Cl.

CPC .......... *F16C 33/78* (2013.01); *F16C 33/7823* (2013.01); *F16C 33/7886* (2013.01);
(Continued)

(58) Field of Classification Search

CPC .. F16C 33/78; F16C 33/7823; F16C 33/7886; F16C 33/7896; F16J 15/004; F16J 15/3268

See application file for complete search history.

(56) References Cited

U.S. PATENT DOCUMENTS 4,763,904 A * 8/1988 Martinie .............. F16J 15/3268 277/421
4,906,111 A * 3/1990 Martinie .............. F16J 15/3268 384/480

(Continued)

FOREIGN PATENT DOCUMENTS

CN 117231744 A * 12/2023
CN 220850742 U 4/2024

(Continued)

OTHER PUBLICATIONS

European Search Report. First Office Action for EP Application No. 25153197.6, mailed Jun. 5, 2025, pp. 1-8.

*Primary Examiner* — Nicholas L Foster
(74) *Attorney, Agent, or Firm* — IP Attorneys Group, LLC

(57) ABSTRACT

A sealing system is disclosed. An oil chamber is formed between an annular support and a main shaft. One side of the oil chamber can be sealed by using a dust-proof seal, to achieve dust-proof and waterproof effects at this side. The oil seal can be functioned to seal a bearing side. After a flexible oil retainer is mounted onto a main shaft through a limiting structure, a labyrinth can be formed in the oil chamber, thereby effectively improving the ability to prevent the oil from flowing out. Additionally, an oil guide hole can be used to recycle the oil, to avoid oil accumulation. Meanwhile, the flexible oil retainer is made of a flexible material, which can avoid damages to components of the labyrinth system during installation and operation of a wind turbine. Moreover, the flexible oil retainer is in a flexible design, and easy to mount and maintain.

10 Claims, 7 Drawing Sheets

(52) U.S. Cl.
CPC ......... *F16C 33/7896* (2013.01); *F16J 15/004* (2013.01); *F16J 15/3268* (2013.01)

(56) References Cited

U.S. PATENT DOCUMENTS

| | | | | | |
|---|---|---|---|---|---|
| 5,011,301 | A * | 4/1991 | Martinie | F16J 15/002 384/150 |
| 9,233,745 | B2 * | 1/2016 | Rusch | F16J 15/004 |
| 10,030,776 | B2 * | 7/2018 | Baumann | F16J 15/004 |
| 11,486,444 | B2 * | 11/2022 | Capoldi | F16C 33/76 |
| 2014/0346738 | A1 * | 11/2014 | Rusch | F16J 15/004 29/401.1 |
| 2017/0167614 | A1 * | 6/2017 | Baumann | F16J 15/3296 |
| 2021/0140482 | A1 * | 5/2021 | Capoldi | F16C 33/586 |
| 2025/0251022 | A1 * | 8/2025 | Capoldi | F16C 33/7816 |

FOREIGN PATENT DOCUMENTS

| | | | | |
|---|---|---|---|---|
| CN | 221443105 | U | 7/2024 | |
| EP | 4589179 | A1 * | 7/2025 | F16C 33/78 |
| JP | 2016003659 | A | 1/2016 | |

* cited by examiner

SEALING SYSTEM

CROSS-REFERENCE TO RELATED APPLICATION

This application is based on and claims the benefit of priority from Chinese Patent Application No. 2024100916952, filed on Jan. 22, 2024, the entirety of which is incorporated by reference herein.

TECHNICAL FIELD

The present disclosure relates to the field of main shaft bearing seals, and in particular, to a sealing system.

BACKGROUND

In the existing technology, the working quality of a bearing directly affects the service life of mechanical equipment, and the main environmental factors of bearing damage mainly include external impurities entering the inside of the bearing or insufficient lubrication inside the bearing. Therefore, ensuring good sealing performance of the bearing is critical to effectively extending its service life.

In the existing technology, bearing lubrication has attracted much attention, especially in wind turbines. The main shaft bearing sealing system is an important structure to ensure the continuous and stable operation of the wind turbines, and mainly functions in preventing the leakage of lubricating media (such as: lubricating oil, lubricating grease), to ensure that the main shaft bearing runs in a good lubricating system. However, with the update and iteration of the wind turbines, the method that a main shaft bearing lubricates a system shows diversity (such as: oil lubrication, grease lubrication), the eccentricity/runout of the wind turbines have increased, and the traditional sealing system cannot complete the effective sealing of the lubricating medium, and cannot achieve the circulation of the lubricating medium either.

SUMMARY

The present disclosure aims to solve at least one of the technical problems in the existing technology. To this end, a sealing system is proposed herein, which can effectively improve the sealing effect of the sealing system.

According to an embodiment of the present disclosure, a sealing system includes:

- an end cover sleeved over a main shaft;
- an annular support sleeved over the main shaft and connected to the end cover, wherein a dust-proof seal mounting structure is disposed on one side of the annular support away from the end cover, an oil chamber is formed between the annular support and the main shaft, and an oil guide hole in communication with the oil chamber is provided in the annular support; the end cover is disposed at one side adjacent to a bearing; and an oil seal mounting groove is formed between the end cover and the annular support, and an opening of the oil seal mounting groove faces the main shaft;
- an oil seal disposed in the oil seal mounting groove and abutting against the main shaft;
- a dust-proof seal disposed at the dust-proof seal mounting structure and abutting against the main shaft;
- a pressing plate pressing the dust-proof seal onto the dust-proof seal mounting structure; and
- a flexible oil retainer sleeved over the main shaft and positioned in the oil chamber, wherein a limiting structure is disposed on the main shaft, and the limiting structure is configured to limit movement of the flexible oil retainer.

According to the embodiment of the present disclosure, the sealing system has at least the following beneficial effects.

The oil chamber is formed between the annular support and the main shaft, one side of the oil chamber can be sealed by using the dust-proof seal, to achieve dust-proof and waterproof effects at this side. The oil seal can be functioned to seal the bearing side, and after the flexible oil retainer is mounted onto the main shaft through the limiting structure, a labyrinth can be formed in the oil chamber, thereby effectively improving the ability to prevent the oil from flowing out. In addition, the oil guide hole can be used to recycle the oil, to avoid oil accumulation. Meanwhile, the flexible oil retainer is made of a flexible material, which can avoid damages to components of the labyrinth system during the installation and operation of the wind turbine. Moreover, the flexible oil retainer is in a flexible design, and easy to mount and maintain.

According to some embodiments of the present disclosure, the annular support includes a plurality of sub-arc plates, a connecting concave surface is disposed on an outer peripheral side of each of the sub-arc plates, and the connecting concave surface is provided with a first connecting hole for being connected with the end cover along an axial direction of the main shaft; a second connecting hole for being connected with the pressing plate is provided on one side of each of the sub-arc plates away from the end cover; the sub-arc plates are each provided with respective grooves on an inner peripheral side of the sub-arc plates along a radial direction, and the oil chamber is formed between the grooves and the main shaft; the oil guide hole in communication with the oil chamber is provided in at least one of the sub-arc plates positioned below an axis of the main shaft; and the sub-arc plates are each provided with respective seal sub limiting and mounting structures on one side of the sub-arc plates away from the end cover, the seal sub limiting and mounting structures are positioned below the second connecting hole and forms the dust-proof seal mounting structure.

According to some embodiments of the present disclosure, a positioning boss is disposed at one end of each of the sub-arc plates, while a positioning groove cooperating with the positioning boss of an adjacent sub-arc plate is disposed at the other end of each of the sub-arc plates, the positioning boss and the positioning groove are provided with a third connecting hole respectively, and the plurality of sub-arc plates are connected in sequence through the positioning boss and the positioning groove.

According to some embodiments of the present disclosure, the oil guide hole is provided on the sub-arc plate that is positioned directly below the main shaft.

According to some embodiments of the present disclosure, at least one hollow-out portion is disposed at the connecting concave surface of each of the sub-arc plates along the axial direction of the main shaft.

According to some embodiments of the present disclosure, each of the seal sub limiting and mounting structures is a dust-proof seal positioning groove that is provided on one side of each of the sub-arc plates away from the end cover, and the dust-proof seal positioning groove is configured to limit movement of the dust-proof seal.

According to some embodiments of the present disclosure, a square limiting groove is provided on one side of each of the sub-arc plates adjacent to the end cover, and the square limiting groove is configured to mount a respective sealing ring and limit movement of the sealing ring.

According to some embodiments of the present disclosure, a cross section of each of the grooves is in a trapezoid shape or in a rectangular shape.

According to some embodiments of the present disclosure, the limiting structure is an annular limiting groove provided on the main shaft, and the flexible oil retainer is engaged in the annular limiting groove.

According to some embodiments of the present disclosure, the limiting structure is an annular limiting groove provided on the main shaft, both sides of the flexible oil retainer adjacent to the main shaft are provided with flexible interference structures, and the flexible oil retainer is in an interference fit with the annular limiting groove through the flexible interference structures.

According to some embodiments of the present disclosure, the flexible interference structures are wavy structures.

According to some embodiments of the present disclosure, a thickness of the flexible oil retainer on the side adjacent to the main shaft is greater than that of the flexible oil retainer on the side away from the main shaft.

According to some embodiments of the present disclosure, the thickness of the flexible oil retainer decreases from the side adjacent to the main shaft to the side away from the main shaft.

According to some embodiments of the present disclosure, a cross section of the flexible oil retainer is in an r-shape.

According to some embodiments of the present disclosure, the cross section of the flexible oil retainer is in a multi-point sealing type.

According to some embodiments of the present disclosure, a plurality of flexible oil retainers and a plurality of limiting structures are provided, and the plurality of limiting structures are disposed in one-to-one correspondence with the plurality of flexible oil retainers.

According to some embodiments of the present disclosure, the flexible oil retainers use rubber oil retainers.

According to some embodiments of the present disclosure, the oil guide hole communicates with a gear box.

According to some embodiments of the present disclosure, an inner ring portion of the dust-proof seal extends away from the end cover.

According to some embodiments of the present disclosure, the pressing plate uses a plastic pressing plate, and the annular support uses a plastic support.

According to some embodiments of the present disclosure, the oil seal includes:

- a rubber body having a cross section including a shoulder, a waist and a lip connected in sequence, an elastic opening being formed between an inner side of the shoulder and the waist, wherein a rubber hardness of one side of the shoulder away from the lip is greater than a rubber hardness of one side of the shoulder adjacent to the lip, a rubber hardness of the waist and a rubber hardness of the lip, and a metal support structure is disposed in the shoulder at one side of the shoulder away from the lip; and
- an interference elastic member disposed along the elastic opening and configured to provide an elastic support force to the lip.

According to some embodiments of the present disclosure, the interference elastic member uses a leaf spring, and one end of the leaf spring is embedded into one end of the waist adjacent to the lip, while the other end of the leaf spring is embedded into the shoulder.

According to some embodiments of the present disclosure, the other end of the leaf spring extends from the elastic opening to one side of the shoulder adjacent to the elastic opening, and is embedded into the shoulder.

According to some embodiments of the present disclosure, a seal protrusion is disposed on one side of the shoulder adjacent to the elastic opening, and a height at which the leaf spring is embedded into the shoulder is lower than that of the seal protrusion.

According to some embodiments of the present disclosure, the seal protrusion is disposed on the shoulder at a position with large rubber hardness.

According to some embodiments of the present disclosure, the leaf spring is embedded into a bottom of the seal protrusion.

According to some embodiments of the present disclosure, the interference elastic member uses a finger spring.

According to some embodiments of the present disclosure, the metal support structure is a metal wire.

According to some embodiments of the present disclosure, the metal wire is a steel wire.

According to some embodiments of the present disclosure, the rubber with a lower rubber hardness in the shoulder, the rubber of the waist and the rubber of the lip are all fluorine rubber, nitrile rubber or acrylate rubber.

Additional aspects and advantages of the present disclosure will be set forth in part in the description which follows, and in part will be obvious from the description, or may be learned by practice of the present disclosure.

BRIEF DESCRIPTION OF DRAWINGS

The present disclosure will be further described below in conjunction with the accompanying drawings and embodiments, where.

REFERENCE NUMERALS

Figure 1:
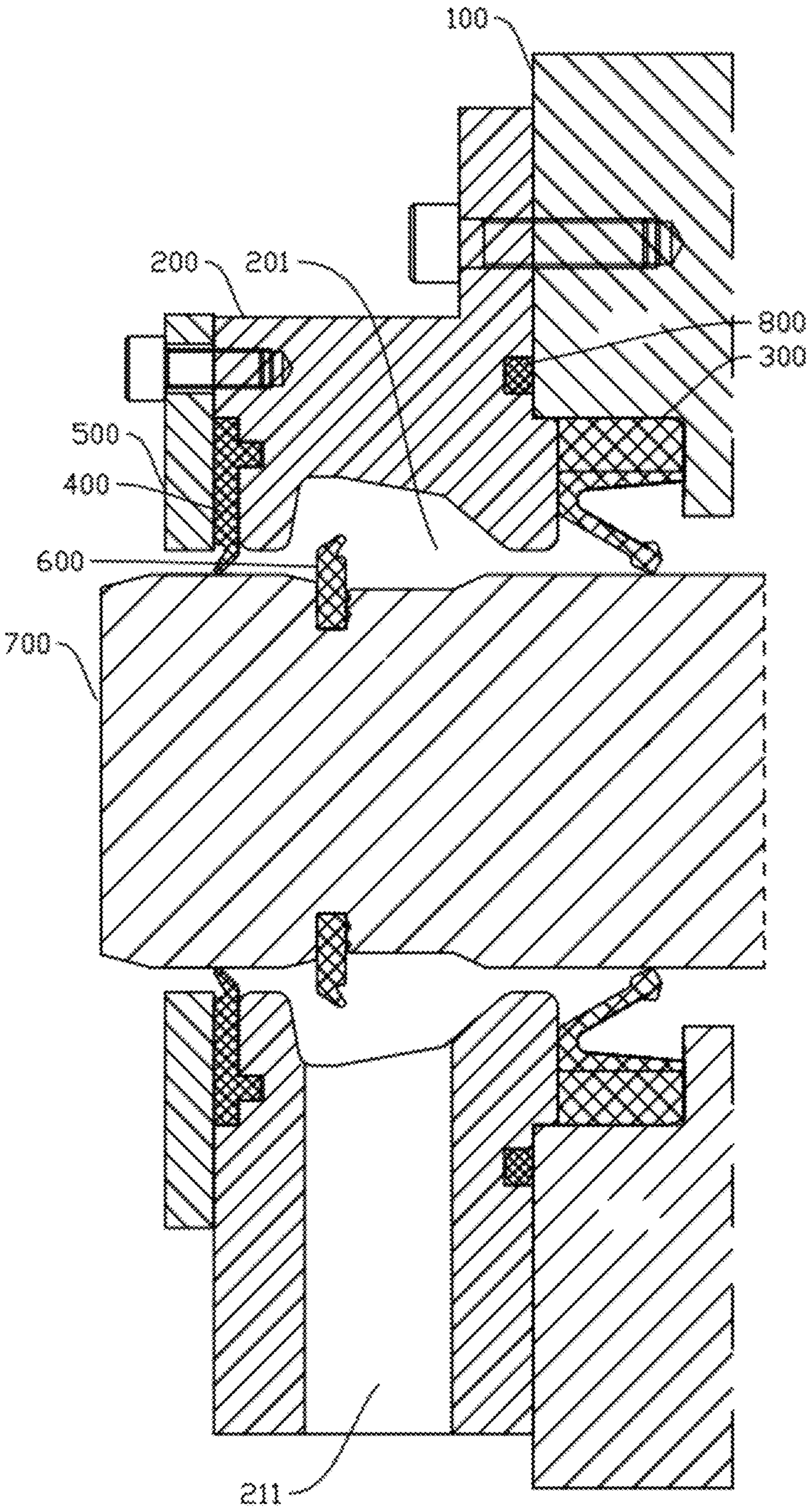
FIG. 1 is a schematic cross-sectional structural view of a sealing system according to an embodiment of the present disclosure.

- end cover 100,
- annular support 200, oil chamber 201, sub-arc plate 210, oil guide hole 211, positioning boss 212, positioning groove 213, hollow-out portion 214, dust-proof seal positioning groove 215, square limit slot 216, oil seal 300, shoulder 311, seal protrusion 312, waist 313, lip 314, metal support structure 315, interference elastic member 320,
dust-proof seal 400,
pressing plate 500,
flexible oil retainer 600, flexible interference structure 610,
main shaft 700,
sealing ring 800.

DETAILED DESCRIPTION

Embodiments of the present disclosure are described in detail below, the examples of which are shown in the accompanying drawings. The same or similar numerals throughout indicate the same or similar components or components with same or similar function. The embodiments described with reference to the drawings are exemplary, which are merely used to explain the present disclosure, instead of being understood as a limitation to the present disclosure.

In the description of the present disclosure, it is understood that orientation or position relationships indicated by terms such as "up", "down", and the like are based on the orientation or position relationships as shown in the drawings, which are provided for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the term "a plurality of" refers to two or more. The terms such as "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless explicitly defined otherwise, the terms such as "set", "install", "connect" and the like should be understood in a broad sense. Those of ordinary skill in the art may reasonably determine the specific meaning of the terms in the present disclosure in combination with the specific contents of the technical solution.

Referring to FIG. 1, which is a schematic cross-sectional structural view of a sealing system according to an embodiment of the present disclosure. The sealing system includes: an end cover 100, an annular support 200, an oil seal 300, a dust-proof seal 400, a pressing plate 500 and a flexible oil retainer 600.

The end cover 100 is sleeved over a main shaft 700.

The annular support 200 is sleeved over the main shaft 700 and connected to the end cover 100. A dust-proof seal mounting structure is disposed on one side of the annular support 200 away from the end cover 100. An oil chamber 201 is formed between the annular support 200 and the main shaft 700, an oil guide hole 211 in communication with the oil chamber 201 is provided in the annular support 200. The end cover 100 is disposed adjacent to one side of a bearing. An oil seal mounting groove is formed between the end cover 100 and the annular support 200, and an opening of the oil seal mounting groove faces the main shaft 700.

The oil seal 300 is disposed in the oil seal mounting groove and abuts against the main shaft 700.

The dust-proof seal 400 is disposed at a dust-proof seal mounting structure and abuts against the main shaft 700.

The pressing plate 500 presses the dust-proof seal 400 onto the dust-proof seal mounting structure.

The flexible oil retainer 600 is sleeved over the main shaft 700 and positioned in the oil chamber 201. A limiting structure is disposed on the main shaft 700, and the limiting structure is used to limit the movement of the flexible oil retainer 600.

Referring to FIG. 1, the end cover 100 and the annular support 200 are sleeved over the annular structure in sequence. The end cover 100 is disposed on one side adjacent to a bearing of the main shaft 700 of the wind turbine, and the oil chamber 201 is formed between the annular support 200 and the main shaft 700. A concave surface is disposed on an inner peripheral side of the end cover 100 at one side thereof connected with the annular support 200. The oil seal mounting groove is formed between the concave surface and the side of the annular support 200 adjacent to the end cover 100. The oil seal 300 may be mounted through the oil seal mounting groove and abut against the main shaft 700, and then a bearing side can be sealed by using the oil seal 300. A dust-proof seal mounting structure is disposed on one side of the annular support 200 away from the end cover 100. The pressing plate 500 can press the dust-proof seal 400 onto the dust-proof seal mounting structure, and the mounted dust-proof seal 400 will also abut against the main shaft 700, thus achieving the sealing for an air side by using the dust-proof seal 400. Moreover, a limiting structure is disposed on the main shaft 700 at a section thereof corresponding to the oil chamber 201, and the flexible oil retainer 600 can be limited through the limiting structure after being sleeved over the main shaft 700, to avoid the random movement caused by the existence of the oil. The flexible oil retainer 600 is disposed in the oil chamber 201, allowing the oil chamber 201 to become a labyrinth structure, to effectively improve the ability to prevent the oil from flowing out. When the leaking oil enters the oil chamber 201, the leaking oil will be blocked by the labyrinth structure and recycled through the oil guide hole 211, thereby avoiding the oil accumulation in the labyrinth structure.

In addition, the flexible oil retainer 600 in the sealing system according to an embodiment of the present disclosure is made of a flexible material, which can avoid damages to labyrinth system components during the installation and operation of the wind turbine. Moreover, the flexible oil retainer 600 is in a flexible design, and easy to mount and maintain.

In some embodiments, the annular support 200 includes a plurality of sub-arc plates 210, a connecting concave surface is disposed on an outer peripheral side of each of the sub-arc plates 210, and the connecting concave surface is provided with a first connecting hole for being connected with the end cover 100 along an axial direction of the main shaft 700. A second connecting hole for being connected with the pressing plate 500 is provided on one side of each of the sub-arc plates 210 away from the end cover 100. the sub-arc plates 210 are each provided with respective grooves on an inner peripheral side of the sub-arc plates along a radial direction, and the oil chamber 201 is formed between the grooves and the main shaft 700. The oil guide hole 211 in communication with the oil chamber 201 is provided in at least one of the sub-arc plates 210 positioned below an axis of the main shaft 700. The sub-arc plates 210 are each provided with respective seal sub limiting and mounting structures on one side of the sub-arc plates away from the end cover 100, the seal sub limiting and mounting structures are positioned below the second connecting hole and forms the dust-proof seal mounting structure.

Referring to FIGS. 1 to 6, the quantity of the sub-arc plates 210 is at least two. This structure of splitting the annular support 200 can facilitate the transportation and installation of the sub-arc plates 210. In some embodiments, the quantity of the sub-arc plates 210 may also be more than two, such as 6, 8, etc. Such arrangement of large number can further reduce the difficulty of production, transportation and installation. It can be understood that, in order to better achieve the discharge of oil or grease in the labyrinth structure, the oil guide hole 211 will be provided in the sub-arc plate 210 below the main shaft 700. Meanwhile, the connecting concave surface is disposed on the outer peripheral side of the sub-arc plate 210. The first connecting hole is provided in the connecting concave surface along the axial direction of the main shaft 700, and a connecting hole corresponding to the first connecting hole is also provided in the end cover 100 at a position where it is connected with the annular support 200, thus the annular support 200 formed by the plurality of sub-arc plates 210 can be connected to the end cover 100. Moreover, a second connecting hole is provided on one side of each of the sub-arc plates 210 away from the end cover 100, while a connecting hole corresponding to the second connecting hole is also provided in the pressing plate 500, thus the pressing plate 500 can be fixed onto the annular support 200 by using the second connecting hole. Finally, a groove is provided on the inner peripheral side of each sub-arc plate 210, the grooves of the plurality of sub-arc plates 210 are spliced to form an annular slot structure, and the oil chamber 201 can be formed between the annular slot structure and the main shaft 700.

Referring to FIGS. 2 to 6, in some embodiments, a positioning boss 212 is disposed at one end of each of the sub-arc plates 210 while a positioning groove 213 cooperating with the positioning boss 212 of an adjacent sub-arc plate 210 is disposed at the other end of each of the sub-arc plates 210, the positioning boss 212 and the positioning groove 213 are provided with a third connecting hole, respectively, and the plurality of sub-arc plates 210 are connected in sequence through the positioning boss 212 and the positioning groove 213. By using the positioning boss 212 and the positioning groove 213 for cooperative connection, the connecting stability between two adjacent sub-arc plates 210 can be ensured. In some embodiments, the positioning boss 212 and the positioning groove 213 are arranged in a square structure, so that the adjacent sub-arc plates 210 can be docked more quickly and accurately while ensuring the connecting stability.

Figure 2:
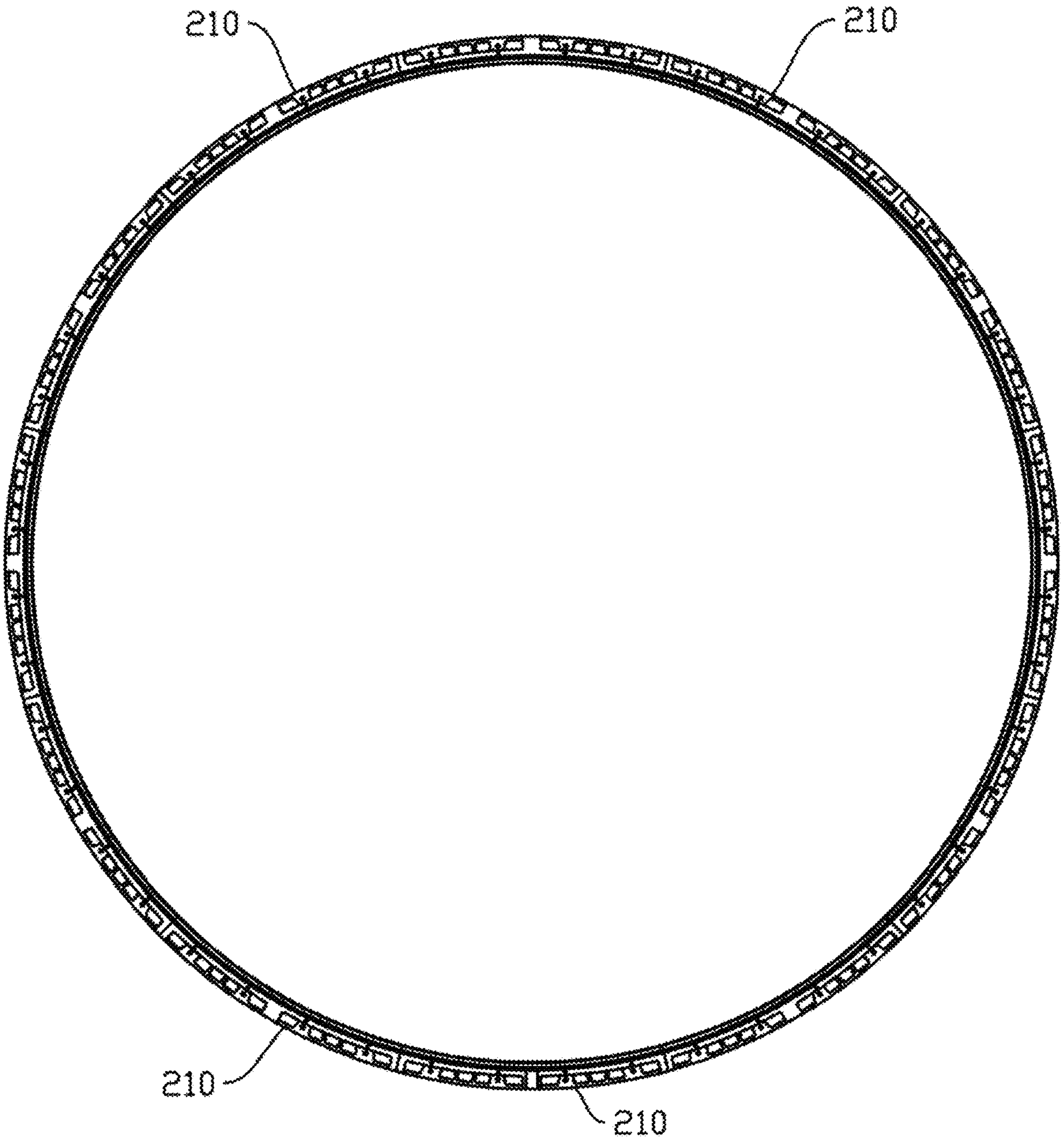
FIG. 2 is a schematic structural view of an annular support according to an embodiment of the present disclosure.
Figure 3:
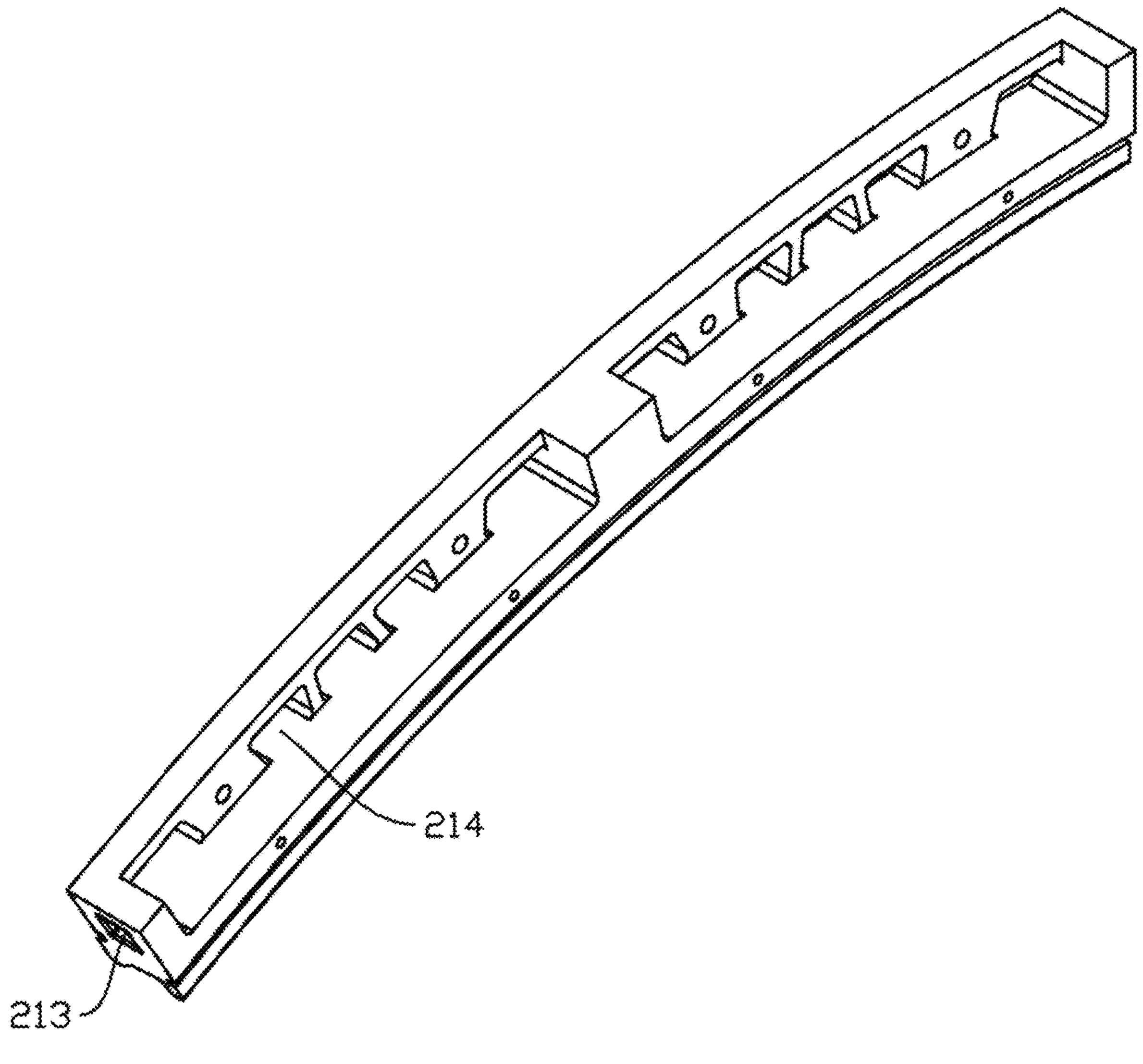
FIG. 3 is a schematic structural view (no oil guide hole is provided) of a shaft side of a sub-arc plate according to an embodiment of the present disclosure.
Figure 4:
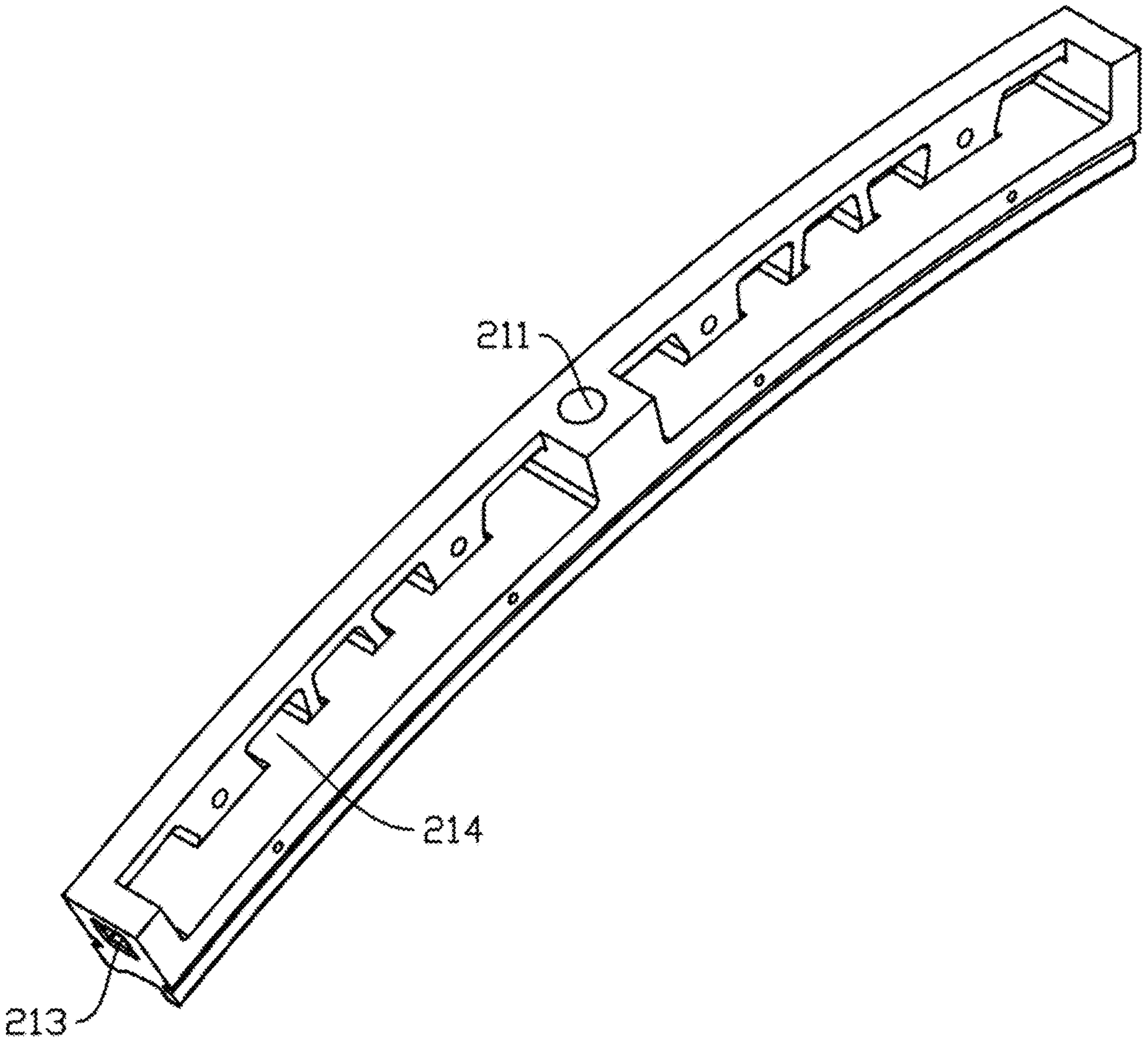
FIG. 4 is a schematic structural view (an oil guide hole is provided) of a shaft side of a sub-arc plate according to an embodiment of the present disclosure.
Figure 5:
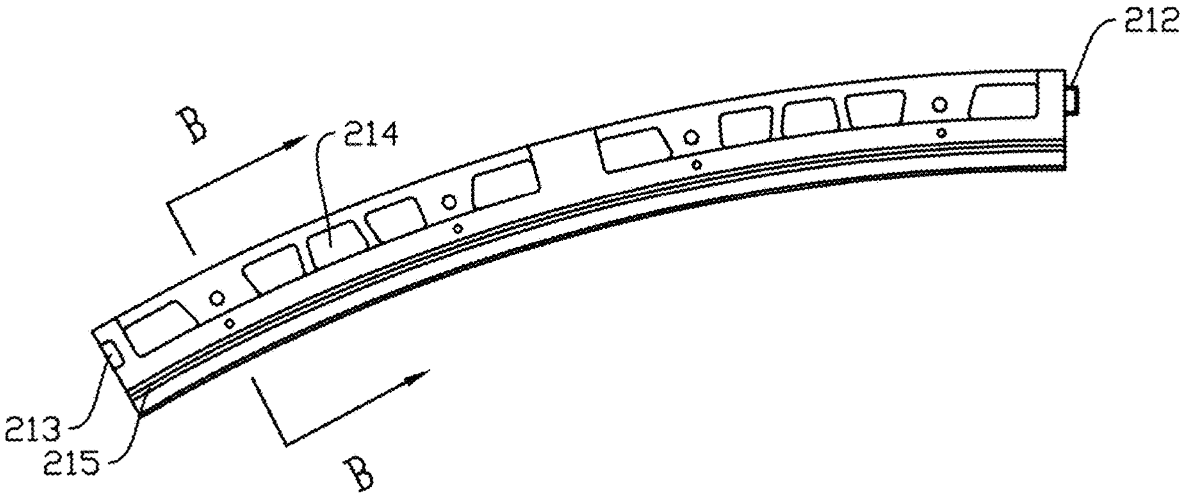
FIG. 5 is a schematic front structural view of a sub-arc plate according to an embodiment of the present disclosure.

In some embodiments, the oil guide hole 211 is provided in the sub-arc plate 210 positioned directly below the main shaft 700. With reference to FIG. 2, the oil guide hole 211 is provided below the main shaft 700, to facilitate the discharge of oil or grease. It should be noted that when using the oil, the oil guide hole 211 is only provided in the sub-arc plate 210 directly below the main shaft 700, which can better facilitate the recovery of oil to the gear box. When using the grease, a plurality of oil guide holes 211 may be provided below the main shaft 700, for example, in the clock direction such as half past four, six, half past seven, to facilitate the discharge of grease.

Referring to FIGS. 2 to 5, in some embodiments, at least one hollow-out portion 214 is provided at the connecting concave surface of each of the sub-arc plates 210 along the axial direction of the main axis 700. The arrangement of the hollow-out portion 214 can effectively reduce the use of consumables, while ensuring that the overall structure is slightly damaged. In some embodiments, all hollow-out portions 214 provided in the annular support 200 are symmetrically distributed.

Referring to FIGS. 1, 3 to 6, in some embodiments, each of the seal sub limiting and mounting structures is a dust-proof seal positioning groove 215 that is provided on one side of each of the sub-arc plates 210 away from the end cover 100, and the dust-proof seal positioning groove 215 is used to limit the movement of the dust-proof seal 400. The dust-proof seal positioning groove 215 can be configured as an inverted two-step pyramid groove structure, or it can be understood that a concave surface is disposed on one side away from the end cover 100, and then the concave surface is further provided with a groove, to form the dust-proof seal positioning groove 215. The dust-proof seal 400 can be effectively fixed by utilizing the dust-proof seal positioning groove 215.

Figure 6:
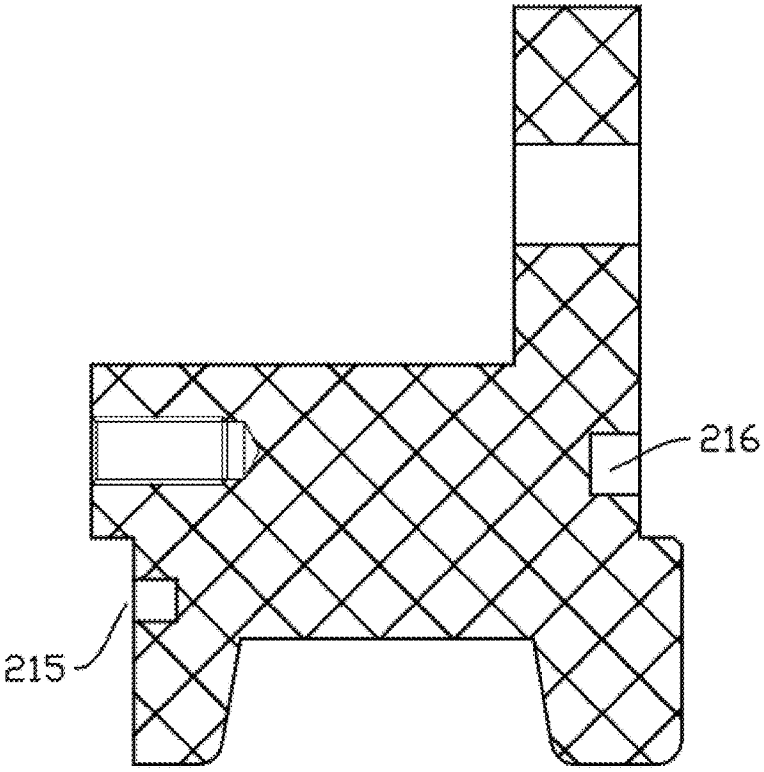
FIG. 6 is a cross-sectional view of B-B in FIG. 5.

Referring to FIGS. 1 and 6, in some embodiments, a square limiting groove 216 is provided on one side of each of the sub-arc plates 210 adjacent to the end cover 100, and a plurality of square limiting grooves 216 are used to mount the respective sealing rings 800 and limit the movement of the sealing rings 800. The arrangement of the annular sealing rings 800 can ensure that oil and grease will not flow out from the gap between the end cover 100 and the annular support 200, to ensure the sealing performance of the oil chamber 201.

In some embodiments, the cross section of the groove is in a trapezoid shape or in a rectangular shape. When the medium used is oil, the groove is in the trapezoid shape, and when the medium used is grease, the groove is in the rectangular shape. Such arrangement of using different oil chamber 201 structures for the oil and grease can better form an effective oil chamber 201 structure.

Figure 7:
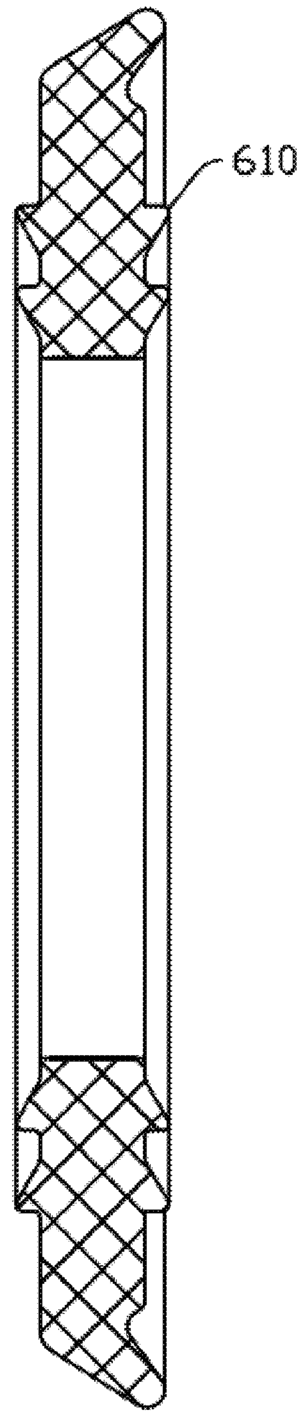
FIG. 7 is a schematic structural view of a flexible oil retainer according to an embodiment of the present disclosure.

In some embodiments, the limiting structure is an annular limiting groove provided in the main shaft 700, and the flexible oil retainer 600 is engaged in the annular limiting groove. Referring to FIGS. 1 and 7, the flexible oil retainer 600 can be engaged using the annular limiting groove, and the annular limiting groove is used for limiting, which also facilitates the mounting of the flexible oil retainer 600.

In some embodiments, both sides of the flexible oil retainer 600 adjacent to the main shaft 700 are provided with flexible interference structures 610, and the flexible oil retainer 600 is in an interference fit with the annular limiting groove through the flexible interference structures 610. Referring to FIGS. 1 and 7, after the flexible oil retainer 600 is engaged in the annular limiting groove, the flexible interference structures 610 can tightly engage the flexible oil retainer 600 in the annular limiting groove.

In some embodiments, the flexible interference structures 610 are wavy structures. Referring to FIGS. 1 and 7, the wavy structures can effectively increase the contact area with the annular limiting groove, and can better cooperate with the main shaft 700 to prevent oil leakage.

Referring to FIG. 7, in some embodiments, the thickness of the flexible oil retainer 600 on the side adjacent to the main shaft 700 is greater than that of the flexible oil retainer 600 on the side away from the main shaft 700. The thicker inner side can facilitate the stable installation of the flexible oil retainer 600.

Referring to FIG. 7, in some embodiments, the thickness of the flexible oil retainer 600 decreases from the side adjacent to the main shaft 700 to the side away from the main shaft 700. The smaller the area, the better the elasticity of materials such as rubber. The gradient structural design can better utilize this advantage, thereby better achieving the purpose of flexible oil retaining.

Referring to FIG. 7, in some embodiments, the cross section of the flexible oil retainer 600 is in an r-shape. The r-shape and an offset direction toward the side of the oil seal 300 can better achieve the blocking for the leaking oil.

In some embodiments, the cross section of the flexible oil retainer 600 is in a multi-point sealing type, such as an x-shape and a polygonal shape. After the x-shape is set, the multi-point sealing advantage of the x-shape can better block the grease in the rectangular oil chamber 201 structure.

It should be noted that when selecting a specific cross-sectional shape of the flexible oil retainer 600, it is preferable to select a corresponding oil chamber 201 structure, to better form a labyrinth structure.

Referring to FIG. 1, in some embodiments, a plurality of flexible oil retainers 600 and a plurality of limiting structures are provided, and each of the plurality of limiting structures corresponds to a respective one of the plurality of flexible oil retainers 600. Providing the plurality of flexible oil retainers 600 can better block the oil, and the specific number of flexible oil retainers 600 can be reasonably adjusted according to the size of the oil chamber 201. It should be noted that when used, the plurality of flexible oil retainers 600 can be disposed at equal intervals, or disposed at non-equal intervals according to the specific structure of the oil chamber 201.

In some embodiments, the flexible oil retainers 600 use rubber oil retainers. The rubber is better in elasticity and smooth, which can better achieve the sealing and oil retaining.

In some embodiments, when the oil is used as the medium, the oil guide hole 211 communicates with the gear box. The oil guide hole 211 can guide the retained oil to flow back for use. In this embodiment, the oil can directly flow back to the gear box for direct recycling by the gear box. It should be noted that when applied to different application scenarios, the oil guide hole 211 may be connected to different equipment or oil tanks, and does not necessarily need to be connected back to the gear box.

In some embodiments, an inner ring portion of the dust-proof seal 400 extends away from the end cover 100. Referring to FIG. 1, this structural design that the inner ring portion of the dust-proof seal 400 extends away from the end cover 100 can better improve the dust-proof and seal effects.

In some embodiments, the pressing plate 500 uses a plastic pressing plate, and the annular support 200 uses a plastic support. The plastic structure is corrosion-resistant, lightweight, so it is suitable for installation and maintenance.

In some embodiments, the oil seal 300 includes a rubber body and an interference elastic member 320.

The cross section of the rubber body including a shoulder 311, a waist 313 and a lip 314 connected in sequence, an elastic opening being formed between an inner side of the shoulder 311 and the waist 313. A rubber hardness of one side of the shoulder 311 away from the lip 314 is greater than a rubber hardness of one side of the shoulder 311 adjacent to the lip 314, a rubber hardness of the waist 313 and a rubber hardness of the lip 314. A metal support structure 315 is disposed in the shoulder 311 on one side of the shoulder away from the lip 314.

The interference elastic member 320 is disposed along the elastic opening and configured to provide an elastic support force to the lip 314.

Figure 8:
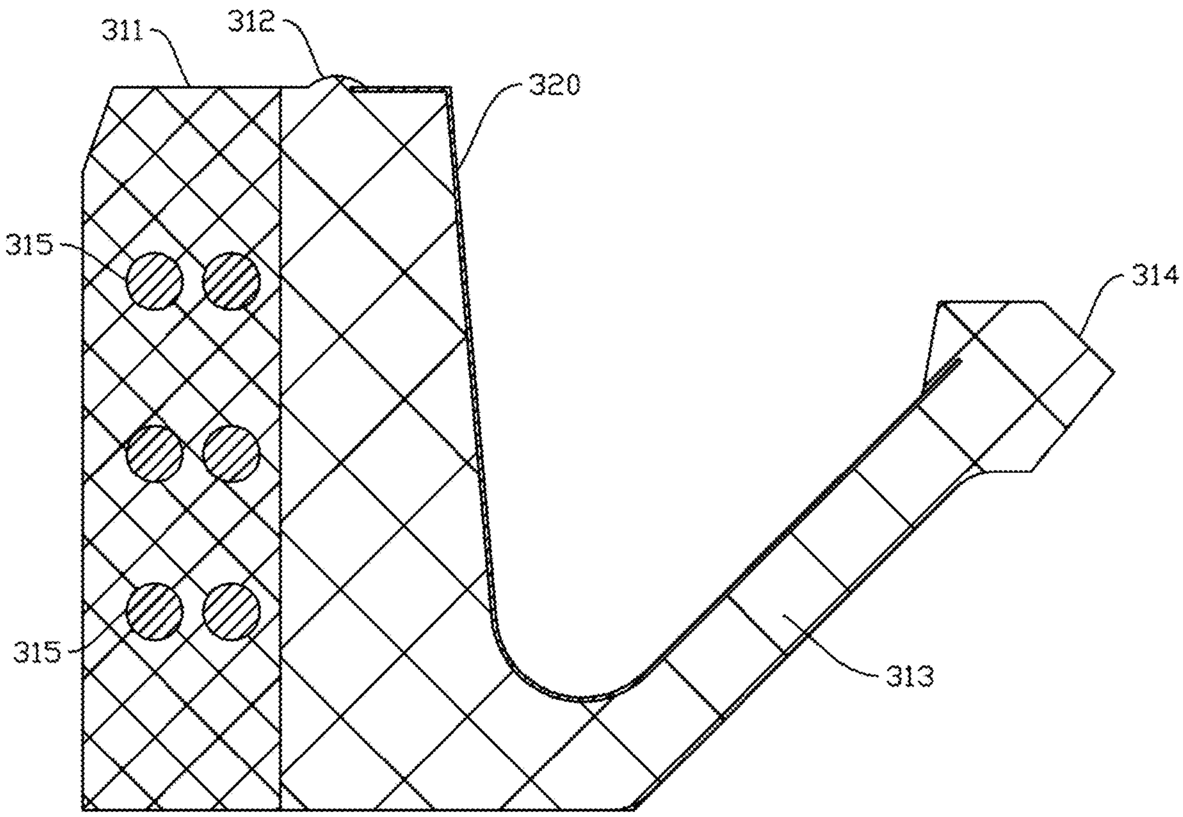
FIG. 8 is a schematic cross-sectional structural view of an oil seal according to an embodiment of the present disclosure.

The rubber body can be regarded as an annular sealing structure, and its cross section is shown in FIG. 8. Reference may also be made to FIG. 1 which shows that the rubber body is mounted onto the main shaft 700 through the end cover 100 and the annular support 200. Referring to FIG. 8, the cross-sectional structure of the rubber body has a shoulder 311, a waist 313 and a lip 314. The inner side of the waist 313 and the shoulder 311 form a 7-shaped elastic opening, and the interference elastic member 320 is disposed along the elastic opening, such that a certain elastic support force can be provided after the rubber body is mounted onto the main shaft 700, allowing the lip 314 to abut against the main shaft 700 tightly and achieving the oil seal 300 of the main shaft 700. Referring to FIG. 8, during actual mounting, to ensure the mounting effect of the rubber body, one side of the shoulder 311 away from the lip 314 is configured as high hardness rubber (the shaded area on the left in FIG. 8), and the high hardness rubber is filled with the metal support structure 315. Because the waist 313 and the lip 314 need to move together with the interference elastic member 320 and complete the oil seal 300 of the main shaft 700, the waist 313 and the lip 314 use low hardness rubber (the shaded area on the right in FIG. 8). In this embodiment, the rubber body is directly used to replace the traditional cloth support structure. The high hardness rubber is used to form part of the shoulder 311 to provide sufficient support. The low hardness rubber is used to form the waist 313 and the lip to ensure the flexibility of the lip. After the interference elastic member 320 is further used to complete the support for the waist 313 and lip, and the oil seal 300 is mounted into the main shaft 700, the lip will be tightly pressed on the surface of the main shaft 700 due to the existence of the interference elastic member 320. At the same time, the high hardness rubber is used as a support, so as to effectively prevent the support structure from shrinking, and the rubber surface is smooth, thus ensuring the effectiveness of the oil seal 300.

As shown in FIG. 8, in some embodiments, the interference elastic member 320 uses a leaf spring, and one end of the leaf spring is embedded into one end of the waist 313 adjacent to the lip 314, while the other end of the leaf spring is embedded into the shoulder 311. The leaf spring is in a leaf-like structure, which can better adhere to the surface of the elastic opening. Moreover, both ends of the leaf spring can be embedded into the rubber body, thereby ensuring the connecting stability between the leaf spring and the elastic opening. It should be noted that the leaf spring can be adhered to the elastic opening by glue while being embedded. It should be noted that because the rubber body is in an annular structure, when the leaf spring is used to provide an elastic force, a plurality of leaf springs need to be arranged in an annular shape, so that each lip 314 in the entire annular structure can tightly abut against the main shaft 700.

In some embodiments, the other end of the leaf spring extends from the elastic opening to one side of the shoulder 311 adjacent to the elastic opening, and is embedded into the shoulder 311. Referring to FIG. 8, the leaf spring is not in a standard 7-shaped structure, and one end of the leaf spring adjacent to the shoulder 311, is further bent, so that the rubber body can be embedded into one side of the shoulder 311 adjacent to the elastic opening. Compared with the method of embedding the leaf spring directly from the inner side of the shoulder 311, the setting is more stable.

Referring to FIG. 8, in some embodiments, a seal protrusion 312 is disposed on one side of the shoulder 311 adjacent to the elastic opening, and a height at which the leaf spring is embedded into the shoulder 311 is lower than that of the seal protrusion 312. The seal protrusion 312 is essentially in an annular sealing ring 800 mounting structure. When the rubber body is mounted onto the main shaft 700, the seal protrusion 312 will also surround the main shaft 700 by one circle, thereby effectively improving the radial sealing effect after the rubber body is mounted.

In some embodiments, the seal protrusion 312 is disposed on the shoulder 311 at a position with large rubber hardness. As shown in FIG. 8, compared with being disposed on rubber with small rubber hardness, the seal protrusion 312 disposed on rubber with large rubber hardness can effectively reduce the manufacturing process, and the leaf spring can be better fixed.

In some embodiments, the leaf spring is embedded into the bottom of the seal protrusion 312. Referring to FIG. 8, by embedding the leaf spring into the bottom of the seal protrusion 312, the leaf spring can be directly attached to the shoulder 311 on the surface where the seal protrusion 312 is positioned. Compared with the method of embedding the leaf spring directly from the main body of the shoulder 311, this method reduces installation difficulty and enhances aesthetic appeal.

In some embodiments, the interference elastic member 320 uses a finger spring. The finger spring can also provide a certain elastic support force to the lip 314 after bending. In addition, the interference elastic member 320 may also be a torsional spring or other products with elasticity.

In some embodiments, the metal support structure 315 is a metal wire. The metal wire structure is easy to fill, and not easy to cause excessive damage to the structure of the rubber itself.

In some embodiments, the metal wire is a steel wire, which is common, cost-effective material with sufficient strength.

In some embodiments, the rubber with lower rubber hardness in the shoulder 311, the rubber of the waist 313 and the rubber of the lip 314 are all fluorine rubber or hydrogenated butadiene-acrylonitrile rubber or nitrile rubber or acrylate rubber.

In some embodiments, the structure of the part with greater rubber hardness in the rubber body and the structure of the part with lower rubber hardness in the rubber body are manufactured separately, and then the two structures can be combined through processes such as vulcanization and bonding to form the rubber body.

In order to better understand the sealing system according to the embodiments of the present disclosure, some embodiments are described here.

In some embodiments, after the end cover 100, the oil seal 300, the annular support 200, and the pressing plate 500 are sleeved over the main shaft 700, preliminary sealing of the leaking oil can be achieved. The dust-proof seal 400 is disposed on a left side of the annular support 200 by using the pressing plate 500, to seal the left side, and an oil chamber 201 is formed between the annular support 200 and the main shaft 700. The annular support 200 is formed by connecting a plurality of sub-arc plates 210 in sequence, a connecting concave surface is disposed on an outer peripheral side of each sub-arc plate 210 for providing a first connecting hole and completing the connection with the end cover 100. A dust-proof seal positioning groove 215 is disposed on one side of each sub-arc plate 210 away from the end cover 100, for mounting the dust-proof seal 400 through the pressing plate 500. Moreover, a trapezoid-shaped or rectangular-shaped groove is provided on an inner peripheral side of each sub-arc plate 210, for forming the oil chamber 201 between the groove and the main shaft 700. Meanwhile, a second connecting hole is provided on one side of each sub-arc plate 210 away from the end cover 100 and above the dust-proof seal positioning groove 215, for mounting the dust-proof seal 400. Meanwhile, a concave surface is provided on an inner peripheral side of one end of the end cover 100 away from the annular support 200, an oil seal mounting groove is formed between this concave surface and the side of the annular support 200 adjacent to the end cover 100, and the oil seal 300 can be mounted through the oil seal mounting groove and abuts against the main shaft 700.

The main shaft 700 is provided with a plurality of annular limiting grooves, and corresponding flexible oil retainers are disposed in the plurality of annular limiting grooves. The thickness of each of the flexible oil retainers 600 gradually decreases from the inside to the outside, and both sides of each of the flexible oil retainers 600 are provided with wavy structures. The wavy structures and the flexible oil retainers 600 are integrally formed, and the wavy structures use an interference structural design, so that the flexible oil retainers 600 can be engaged in the annular limiting grooves by changing the wavy structures. At this point, after the flexible oil retainers 600 are provided, the entire oil chamber 201 forms a flexible labyrinth oil seal 300 structure, which can effectively block the oil, and the blocked oil can be guided to the gear box through the oil guide hole 211, to complete recycling. Meanwhile, an interface of each of the flexible oil retainers 600 is in r-shape or x-shape, which can further improve the blocking effect on oil or grease.

As for the oil seal 300, it includes a rubber body and a leaf spring. The rubber body is in a ring-shaped structure, and a cross section of the rubber body includes a shoulder 311, a waist 313 and a lip 314 that are connected in sequence. The side of the shoulder 311 of the rubber body away from the lip 314 is configured as high hardness rubber, and steel wires are filled in the high hardness rubber. The rest of the rubber body is configured as low hardness rubber. A 7-shaped elastic opening structure is disposed between an inner side of the shoulder 311 and the waist 313, and a seal protrusion 312 is disposed on one side of the shoulder 311 adjacent to the elastic opening, to ensure the radial sealing effect after the oil seal 300 is mounted. The leaf spring is set in a 7-shape and disposed along the elastic opening. One section of the leaf spring is embedded into a tip of the waist 313 while the other end extends from the elastic opening to one side of the shoulder 311 where the seal protrusion 312 is positioned, and is embedded into the bottom of the seal protrusion 312. It is to be noted that glue will be disposed between the rubber body and the leaf spring when the leaf spring is disposed, facilitating the fit therebetween. In addition, the rubber body is in an annular structure, so a plurality of leaf springs are required for annular arrangement when the leaf spring is used to provide the elastic force, such that each lip 314 in the entire annular structure can tightly abut against the main shaft 700. After the oil seal 300 in some embodiments of the present disclosure is mounted onto the main shaft 700, an elastic support force is provided through the leaf springs, such that the lip can tightly abut against the main shaft 700, thus achieving the sealing.

It is to be noted that the cross section of the groove is in a trapezoid shape or in a rectangular shape. When the medium used is oil, the groove is in the trapezoid shape, and when the medium used is grease, the groove is in the rectangular shape. Such arrangement of using different oil chamber 201 structures for the oil and grease can better form an effective oil chamber 201 structure.

In the embodiments of the present disclosure, the sealing system forms a multi-layer sealing structure, where the oil seal 300 forms a first-level seal through interference fit with the main shaft 700, and the sealing rings 800 form a second-level seal after being mounted through the annular support 200 and the end cover 100, then the labyrinth structure composed of the oil chamber 201 and the flexible oil retainer 600 forms a third-level seal, and finally the dust-proof seal 400 forms a fourth-level seal.

The embodiments of the present disclosure are described in detail above in combination with the drawings. However, the present disclosure is not limited the above embodiments. Under the premise of not departing from the gist of the present disclosure, various variations may also be made within the knowledge scope of those having ordinary skill in the art.

What is claimed is:

1. A sealing system, comprising:

an end cover sleeved over a main shaft;

an annular support sleeved over the main shaft and connected to the end cover, wherein a dust-proof seal mounting structure is disposed on one side of the annular support away from the end cover, an oil chamber is formed between the annular support and the main shaft, and an oil guide hole in communication with the oil chamber is provided in the annular support; the end cover is configured to be disposed at one side adjacent to a bearing; and an oil seal mounting groove is formed between the end cover and the annular support, and an opening of the oil seal mounting groove faces the main shaft;

an oil seal disposed in the oil seal mounting groove and abutting against the main shaft;

a dust-proof seal disposed at the dust-proof seal mounting structure and abutting against the main shaft;

a pressing plate pressing the dust-proof seal onto the dust-proof seal mounting structure; and a flexible oil retainer sleeved over the main shaft and positioned in the oil chamber, wherein a limiting structure is disposed on the main shaft, and the limiting structure is configured to limit movement of the flexible oil retainer;

wherein the annular support comprises a plurality of sub-arc plates, a connecting concave surface is disposed on an outer peripheral side of each of the sub-arc plates, and the connecting concave surface is provided with a first connecting hole for being connected with the end cover along an axial direction of the main shaft; a second connecting hole for being connected with the pressing plate is provided on one side of each of the sub-arc plates away from the end cover; the sub-arc plates are each provided with respective grooves on an inner peripheral side of the sub-arc plates along a radial direction, and the oil chamber is formed between the grooves and the main shaft; the oil guide hole in communication with the oil chamber is provided in at least one of the sub-arc plates positioned below an axis of the main shaft; and the sub-arc plates are each provided with respective seal sub limiting and mounting structures on the one side of the sub-arc plates away from the end cover, the seal sub limiting and mounting structures are positioned below the second connecting hole and forms the dust-proof seal mounting structure.

2. The sealing system according to claim 1, wherein a positioning boss is disposed at one end of each of the sub-arc plates, while a positioning groove cooperating with the positioning boss of an adjacent sub-arc plate is disposed at an other end of each of the sub-arc plates, the positioning boss and the positioning groove are provided with a third connecting hole respectively, and the plurality of sub-arc plates are connected in sequence through the positioning boss and the positioning groove.

3. The sealing system according to claim 1, wherein at least one hollowed-out portion is disposed at the connecting concave surface of each of the sub-arc plates along the axial direction of the main shaft.

4. The sealing system according to claim 1, wherein each of the seal sub limiting and mounting structures is a dust-proof seal positioning groove that is provided on one side of each of the sub-arc plates away from the end cover, and the dust-proof seal positioning groove is configured to limit movement of the dust-proof seal.

5. The sealing system according to claim 1, wherein a square limiting groove is provided on one side of each of the sub-arc plates adjacent to the end cover, and the square limiting groove is configured to mount a respective sealing ring and limit movement of the respective sealing ring.

6. The sealing system according to claim 1, wherein a cross section of each of the grooves is in a trapezoid shape or in a rectangular shape.

7. The sealing system according to claim 1, wherein the limiting structure is an annular limiting groove provided on the main shaft, both sides of the flexible oil retainer adjacent to the main shaft are provided with flexible interference structures, and the flexible oil retainer is in an interference fit with the annular limiting groove through the flexible interference structures.

8. The sealing system according to claim 1, wherein an inner ring portion of the dust-proof seal extends away from the end cover.

9. The sealing system according to claim 1, wherein the oil seal comprises:

a rubber body having a cross section comprising a shoulder, a waist and a lip connected in sequence, an elastic opening being formed between an inner side of the shoulder and the waist, wherein a rubber hardness of one side of the shoulder away from the lip is greater than a rubber hardness of one side of the shoulder adjacent to the lip, a rubber hardness of the waist and a rubber hardness of the lip, and a metal support structure is disposed in the shoulder at one side of the shoulder away from the lip; and an interference elastic member disposed along the elastic opening and configured to provide an elastic support force to the lip.

10. The sealing system according to claim 9, wherein the interference elastic member uses a leaf spring, and one end of the leaf spring is embedded into one end of the waist adjacent to the lip, while an other end of the leaf spring is embedded into the shoulder.

* * * * *